(12) United States Patent
Murphy

(10) Patent No.: US 7,898,675 B1
(45) Date of Patent: Mar. 1, 2011

(54) INTERNET GLOBAL AREA NETWORKS FAX SYSTEM

(75) Inventor: Frederick J. Murphy, Utica, NY (US)

(73) Assignee: NetFax Development, LLC, McLean, VA (US)

( * ) Notice: Subject to any disclaimer, the term of this patent is extended or adjusted under 35 U.S.C. 154(b) by 1826 days.

(21) Appl. No.: 08/555,911

(22) Filed: Nov. 13, 1995

(51) Int. Cl.
H04N 1/00 (2006.01)
H04N 1/32 (2006.01)
G06F 15/16 (2006.01)

(52) U.S. Cl. ............ 358/1.13; 358/1.15; 358/402; 358/407; 358/440; 358/442; 358/468; 379/100.08; 379/100.09; 379/100.15; 709/206

(58) Field of Classification Search ........... 358/442, 358/407, 402, 440, 468, 434, 1.15, 1.13; 379/100, 93, 94, 93.05, 93.08, 93.14, 93.15, 379/93.24, 100.01, 100.02, 100.08, 100.09, 379/100.13, 100.15, 100.16, 100.17; 395/200.04, 395/200.18; 709/200, 206, 227–231, 238, 709/245–247
See application file for complete search history.

(56) References Cited

U.S. PATENT DOCUMENTS

| | | | |
|---|---|---|---|
| 4,713,837 A | 12/1987 | Gordon | |
| 4,941,170 A | 7/1990 | Herbst | ............ 358/402 |
| 4,960,981 A | 10/1990 | Benton et al. | |
| 4,969,184 A | 11/1990 | Gordon et al. | |
| 5,091,790 A * | 2/1992 | Silverberg | ............ 358/434 |
| 5,115,326 A | 5/1992 | Burgess et al. | |
| 5,122,950 A | 6/1992 | Benton et al. | |
| 5,127,048 A | 6/1992 | Press | |
| 5,287,202 A * | 2/1994 | Kumarappan | ............ 358/440 |
| 5,291,302 A | 3/1994 | Gordon et al. | |
| 5,339,156 A | 8/1994 | Ishii | |
| 5,363,207 A * | 11/1994 | Yoshihara et al. | ............ 358/442 |
| 5,384,835 A | 1/1995 | Wheeler et al. | |
| 5,404,231 A | 4/1995 | Bloomfield | |
| 5,406,557 A | 4/1995 | Baudoin | ............ 395/200.18 |
| 5,418,624 A | 5/1995 | Ahmed | |
| 5,452,289 A | 9/1995 | Sharma et al. | |
| 5,459,584 A | 10/1995 | Gordon et al. | |
| 5,479,411 A | 12/1995 | Klein | ............ 358/402 |
| 5,497,373 A | 3/1996 | Hulen et al. | |
| 5,513,126 A | 4/1996 | Harkins et al. | |

(Continued)

FOREIGN PATENT DOCUMENTS

CA  2139081  6/1996

(Continued)

OTHER PUBLICATIONS

Rafferty, James P., "Microsoft Sets Its Sights on the Faxmail Market", Data Communications, vol. 23, No. 7, May 1994, p. 29-30.*

(Continued)

Primary Examiner—Scott A Rogers

(57) ABSTRACT

A method and apparatus for transmitting class 1, 2, or 3 fax image data streams over Internet Global Area Networks is shown. A first device converts local fax image data streams into electronic data streams, transmits the data stream over the network, to a second device at the remote fax machine which reconverts the electronic data to fax image data and prints it out on said remote fax machine.

12 Claims, 7 Drawing Sheets

U.S. PATENT DOCUMENTS

| | | | |
|---|---|---|---|
| 5,521,719 A | 5/1996 | Yamada | |
| 5,546,194 A | 8/1996 | Ross | |
| 5,546,388 A * | 8/1996 | Lin | 370/389 |
| 5,550,649 A | 8/1996 | Wong et al. | |
| 5,552,897 A | 9/1996 | Mandelbaum et al. | |
| 5,555,100 A | 9/1996 | Bloomfield et al. | |
| 5,557,425 A | 9/1996 | Hasegawa | |
| 5,559,609 A | 9/1996 | Yamada et al. | |
| 5,559,611 A | 9/1996 | Bloomfield et al. | |
| 5,570,465 A | 10/1996 | Tsakanikas | |
| 5,574,571 A | 11/1996 | Charbonnier | |
| 5,594,225 A | 1/1997 | Botvin | |
| 5,608,786 A | 3/1997 | Gordon | |
| 5,767,985 A * | 6/1998 | Yamamoto et al. | 358/402 |
| 5,793,498 A * | 8/1998 | Scholl et al. | 358/434 |
| 5,805,298 A * | 9/1998 | Ho et al. | 358/402 |
| 5,815,669 A * | 9/1998 | Lee et al. | 709/238 |
| 5,859,967 A * | 1/1999 | Kaufeld et al. | 709/200 |
| 5,872,845 A * | 2/1999 | Feder | 358/442 |
| 5,974,449 A * | 10/1999 | Chang et al. | 709/206 |
| 6,020,980 A | 2/2000 | Freeman | 358/402 |
| 6,088,125 A * | 7/2000 | Okada et al. | 358/402 |
| 6,259,533 B1 * | 7/2001 | Toyoda et al. | 358/1.15 |
| 6,288,799 B1 | 9/2001 | Sekiguchi | 358/468 |
| 6,356,356 B1 * | 3/2002 | Miller et al. | 358/1.15 |
| 6,411,393 B1 * | 6/2002 | Wakasugi | 358/1.15 |
| 6,424,426 B1 * | 7/2002 | Henry | 358/1.15 |
| 6,466,330 B1 * | 10/2002 | Mori | 358/1.15 |
| 6,545,768 B1 * | 4/2003 | Matsubara et al. | 358/1.15 |
| 6,546,005 B1 * | 4/2003 | Berkley et al. | 709/219 |
| 6,587,219 B1 * | 7/2003 | Saito et al. | 358/1.15 |
| 6,594,032 B1 * | 7/2003 | Hiroki et al. | 358/1.15 |
| 6,603,569 B1 * | 8/2003 | Conklin et al. | 358/1.15 |
| 6,614,551 B1 * | 9/2003 | Peek | 358/1.15 |
| 6,710,894 B1 * | 3/2004 | Ogawa | 358/1.15 |
| 6,775,026 B1 * | 8/2004 | Kato | 358/1.15 |
| 6,801,341 B1 * | 10/2004 | Joffe et al. | 358/407 |
| 6,882,438 B1 * | 4/2005 | Kanaya | 358/1.15 |
| 6,967,739 B2 * | 11/2005 | Tanimoto | 358/1.16 |
| 6,972,858 B1 * | 12/2005 | Nishida et al. | 358/1.15 |
| 7,133,142 B2 * | 11/2006 | Matsuura et al. | 358/1.13 |
| 7,149,790 B2 * | 12/2006 | Sugawara | 709/206 |
| 7,212,304 B2 * | 5/2007 | McIntyre et al. | 358/1.15 |
| 7,245,393 B2 * | 7/2007 | Okada et al. | 358/1.15 |
| 7,366,757 B1 * | 4/2008 | Ushida | 709/206 |
| 7,394,559 B2 * | 7/2008 | Mori | 358/1.15 |
| 7,533,147 B2 * | 5/2009 | Hosoi | 709/206 |
| 7,616,336 B2 * | 11/2009 | Nakamura | 358/1.15 |
| 7,706,005 B2 * | 4/2010 | Hayashi et al. | 358/1.15 |
| 7,716,296 B2 * | 5/2010 | Henry | 709/206 |
| 2002/0071136 A1 * | 6/2002 | Bobrow et al. | 358/1.15 |
| 2002/0093674 A1 * | 7/2002 | Ferlitsch et al. | 358/1.15 |
| 2003/0018720 A1 * | 1/2003 | Chang et al. | 709/206 |
| 2004/0174558 A1 * | 9/2004 | Mori | 358/1.15 |
| 2004/0184075 A1 * | 9/2004 | Hayashi et al. | 358/1.15 |
| 2007/0237314 A1 * | 10/2007 | Henry et al. | 379/100.08 |
| 2010/0103462 A1 * | 4/2010 | Maemura | 358/1.15 |

FOREIGN PATENT DOCUMENTS

| | | | | |
|---|---|---|---|---|
| JP | 10164337 A | * | 6/1998 | |
| JP | 11075006 A | * | 3/1999 | |
| JP | 11316720 A | * | 11/1999 | |
| JP | 2000201246 A | * | 7/2000 | |
| JP | 2001211285 A | * | 8/2001 | |
| JP | 2001222478 A | * | 8/2001 | |
| JP | 2001292157 A | * | 10/2001 | |
| JP | 2002009811 A | * | 1/2002 | |
| WO | WO 91/01608 | | 2/1991 | |
| WO | WO 93/10617 | | 5/1993 | |
| WO | WO 96/41463 | * | 12/1996 | |
| WO | WO 97/10668 | | 3/1997 | |
| WO | WO 97/22203 | * | 6/1997 | |
| WO | WO 97/26753 | * | 7/1997 | |

OTHER PUBLICATIONS

Stevens, Alan, "Finansa MailFax—the combined force of e-mail and fax technology", LAN Magazine, Jul. 1993, p. 18-21.*

Patel, Sanjiv P. et al, "The Multimedia Fax-MIME Gateway", IEEE Multimedia, Winter 1994, p. 64-70.*

Patel, Sanjiv P. et al, "Multimedia Fax-MIME Interworking", IEEE1994, p. 325-330.*

Liu, Kun, et al, "Compound Document Transfer Between Electronic-Mail Network and Facsimile Terminals"; IEEE Region 10 Conference on Computer and Communication Systems, Sep. 1990, p. 644-648.*

Fullmer, Chance, et al, "A TCP/IP network facsimile system built from publicaly available software", ACM 1992, p. 523-532.*

Postel, Jonathan B., et al, "An Experimental Multimedia Mail System", ACM Transactions on Office Information Systems, vol. 6, No. 1, Jan. 1988, p. 63-81.*

Rose, Marshall T., "The Internet Message—Closing the Book with Electronic Mail", (Chapter 1), Prentice Hall, 1993.

* cited by examiner

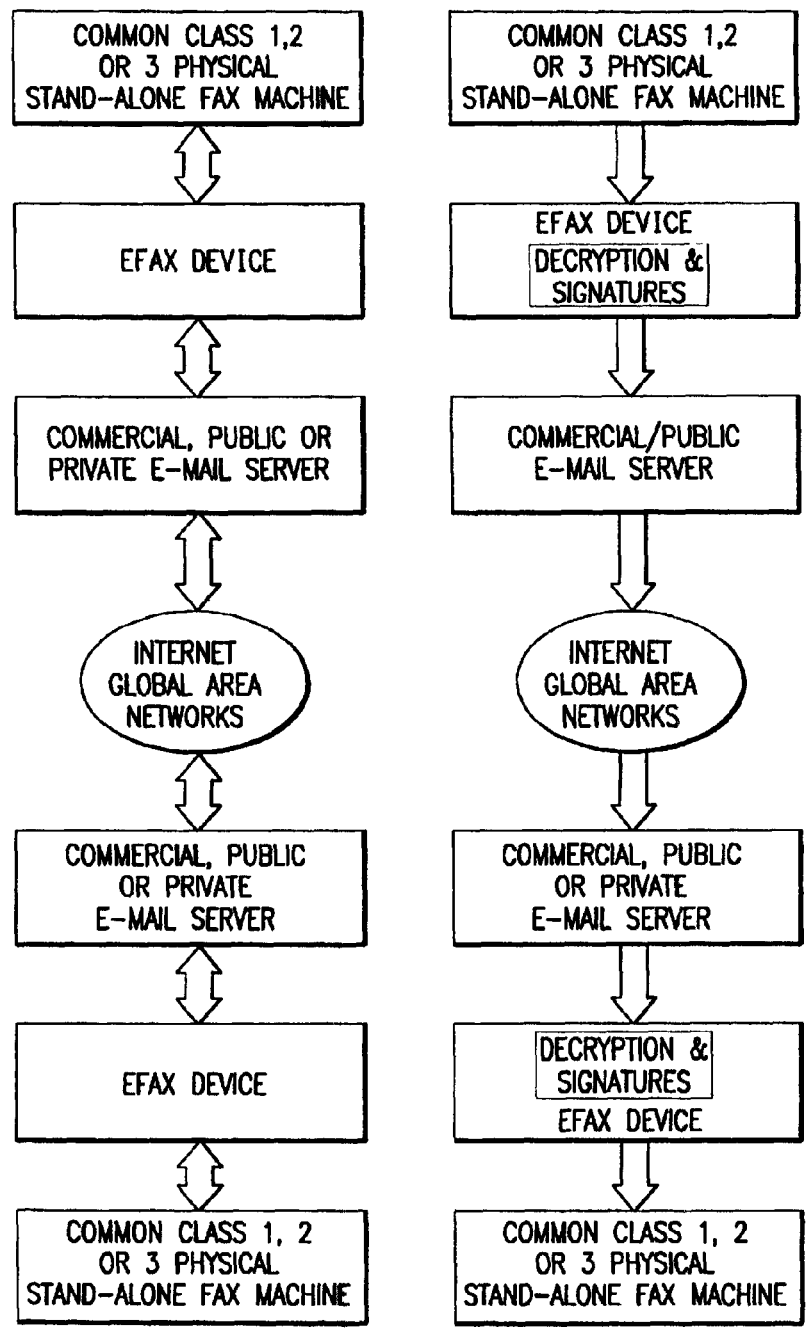

INTERNET GLOBAL AREA NETWORKS FAX SYSTEM

This invention relates to connecting stand alone fax machines for transmitting/receiving facsimile images over remote networks and more particularly to a method and apparatus for attaching common class 1, 2, and 3 fax image data to MIME compliant e-mail for transmitting/receiving conventional Class 1, 2, and 3 fax images and for receiving other electronic data on common class 1, 2, and 3 fax machines over global area networks of which the "Internet" is one example.

BACKGROUND OF INVENTION

In recent years the so called "Fax" machine has become a common device in businesses both large and small and also in many homes. In 1966 the so called Group or Class 1 standards where adopted and with that came the start of the present popularity of the device. Although it took about six minutes to transmit a single page and the resolution was poor it was a big improvement over mail especially for international communications. In 1978 Class 2 standards appeared followed in 1980 by the Class 3, which machines were much faster and had much better resolution. These latter machines take about 30 seconds to transmit a page of text.

Ubiquitous physical stand alone fax machines remain the norm today for every day transmission of written documents and images but lack the ability to directly connect to and send/receive such documents across internet global area networks. The term "internet global area networks" is used herein in the generic sense of interconnected regional, national and international networks over which information in electronic form is transmitted. The "Internet" currently is perhaps the best known of these networks.

PRIOR ART

While fax machines are now thought of as universal all class 1, 2, and 3 machines are currently direct telephonic connection devices and as such acquire toll charges for their use over the telephone companies switches. This of course means that the sender must pay intrastate and interstate long distance toll charges for the time it takes to transmit the desired communication, which in a busy office can amount to hundreds of dollars a month and in an international company to many thousands of dollars. Todays common fax machines cannot communicate directly over internet global area networks nor can they receive electronic mail. Security of internet global area networks communications also is currently difficult to achieve and ensure. The ability to definitively verify the identity of the sender of a fax transmission is often difficult if not impossible to achieve. Also if absolute security is required expensive encryption/decryption devices must be employed to communicate by fax over public telephone lines. Secure private lines can be used but are expensive and limited in the addresses that can be accessed.

The ability to choose when to receive fax transmissions and to decide which ones to print and which ones to discard is not readily available to the average fax user. Negotiating fax transmissions, particularly on a multi use single telephone line, often requires ancillary communications to achieve; i.e. telephone call to agree on when to "turn on the fax machine", priority, re-transmission on "busy", undeliverable, etc.

OBJECTS AND SUMMARY OF INVENTION

Accordingly it is an object of the present invention to provide a method and apparatus that overcomes these limitations of the prior art.

It is another object of the present invention to provide a method and apparatus for transmitting/receiving class 1, 2, and 3 fax images over internet global area networks.

It is another object of the present invention to provide a method and apparatus for transmitting/receiving standard class 1, 2, and 3 fax images over the Internet.

It is another object of the present invention to provide a method and apparatus for transmitting/receiving class 1, 2, and 3 fax images in a highly secure and private manner.

It is a further object of the present invention to provide an economical device that can be easily connected to present class 1, 2, and 3 fax machines and that will enable them to communicate over internet global area networks.

It is a further object of the present invention to provide an economical device that can be easily connected to present class 1, 2, and 3 fax machines that provides a built in electronic mail agent and means for converting the fax image data stream to e-mail SMTF/MIME/MOSS format for transmission/reception over the internet global area networks.

It is a further object of the present invention to provide a device that can easily be connected to class 1, 2, and 3 fax machines that allows e-mail to be printed out thereon.

It is a still further object of the present invention to provide a device that can be easily connected to standard class 1, 2, and 3 fax machines to convert the fax image data stream to MIME enabled e-mail format for transmission/reception with similarly equipped fax machines and e-mail capable computer terminals over the Internet.

These and other and further objects of the present invention are accomplished in one embodiment of the present invention by a device having signal recognition means, a data store and forward buffer, conversion means, an electronic mail agent, management and output means, encryption/decryption means, and software for accomplishing the desired transmission of fax images over internet global area networks.

BRIEF DESCRIPTION OF THE DRAWINGS

FIGS. 4-7 are flow diagrams of the various operational modes of the present invention;

DESCRIPTION OF INVENTION

Figure 1:
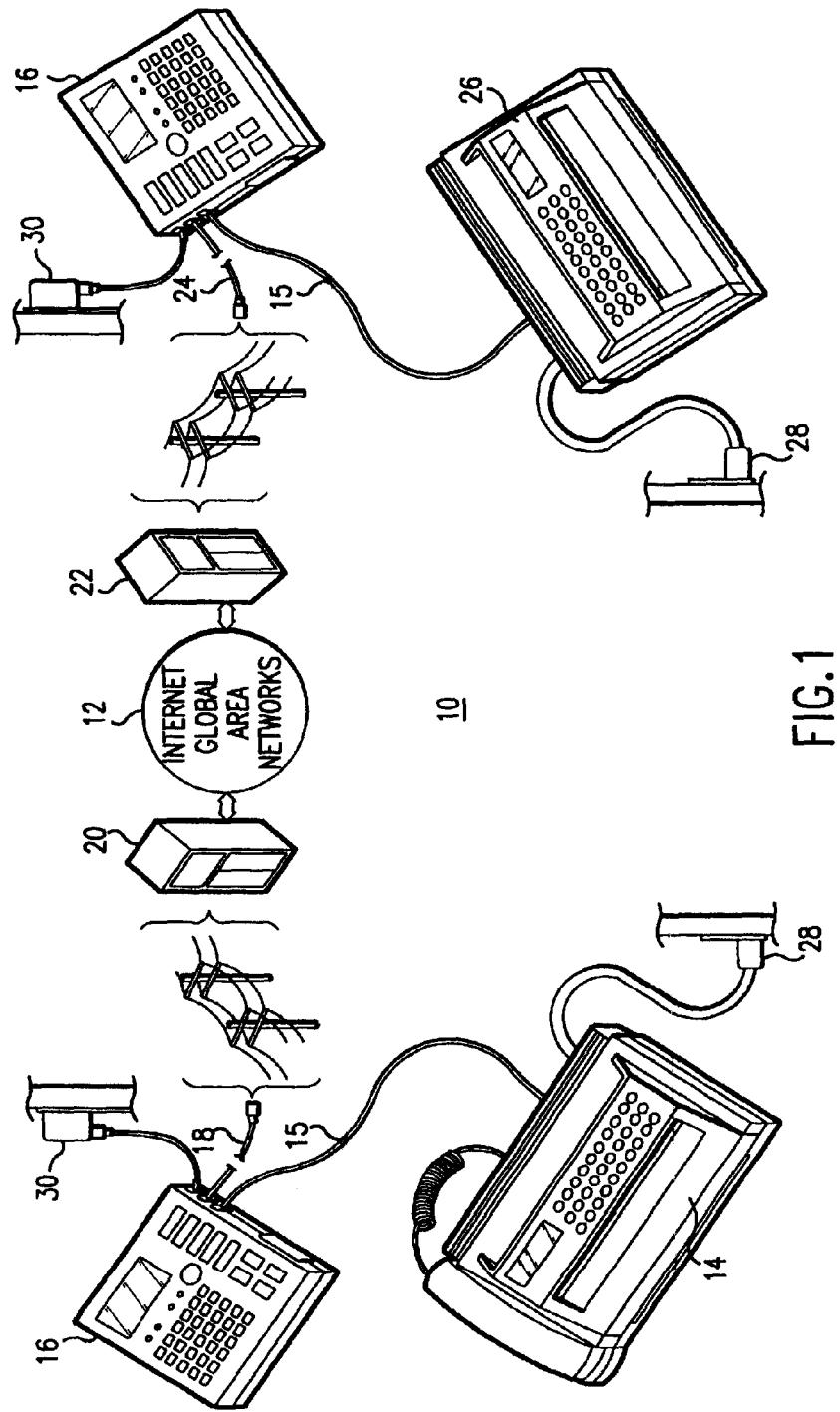
FIG. 1 is a pictorial view of a system according to the present invention.

Referring now to FIG. 1 there is shown a system 10 for transmitting/receiving a fax over the internet global area networks 12. A local fax machine 14 is connected by line 15 to a signal manipulation device 16 which is in turn connected to a plain old telephone (POTS) line 18 which is terminated in an electronic mail agent server 20 such as a commercial or public server which in turn is connected to or resident on the internet global area network 12. A remote electronic mail agent server 22 resident on the internet global area networks 12 at a remote location is connected over a POTS line 24 to another device 16 which in turn is connected to a remote fax machine 26 by another line 15. Fax machines 14 and 26 can be any class 1, 2, or 3 fax machines currently available on the market and are connected to the usual domestic power source at 28. Devices 16 have their own power supplies 30 which convert the usual AC power to the appropriate voltages to power the various components within the devices 16 as will be described in detail herein.

Figure 2:
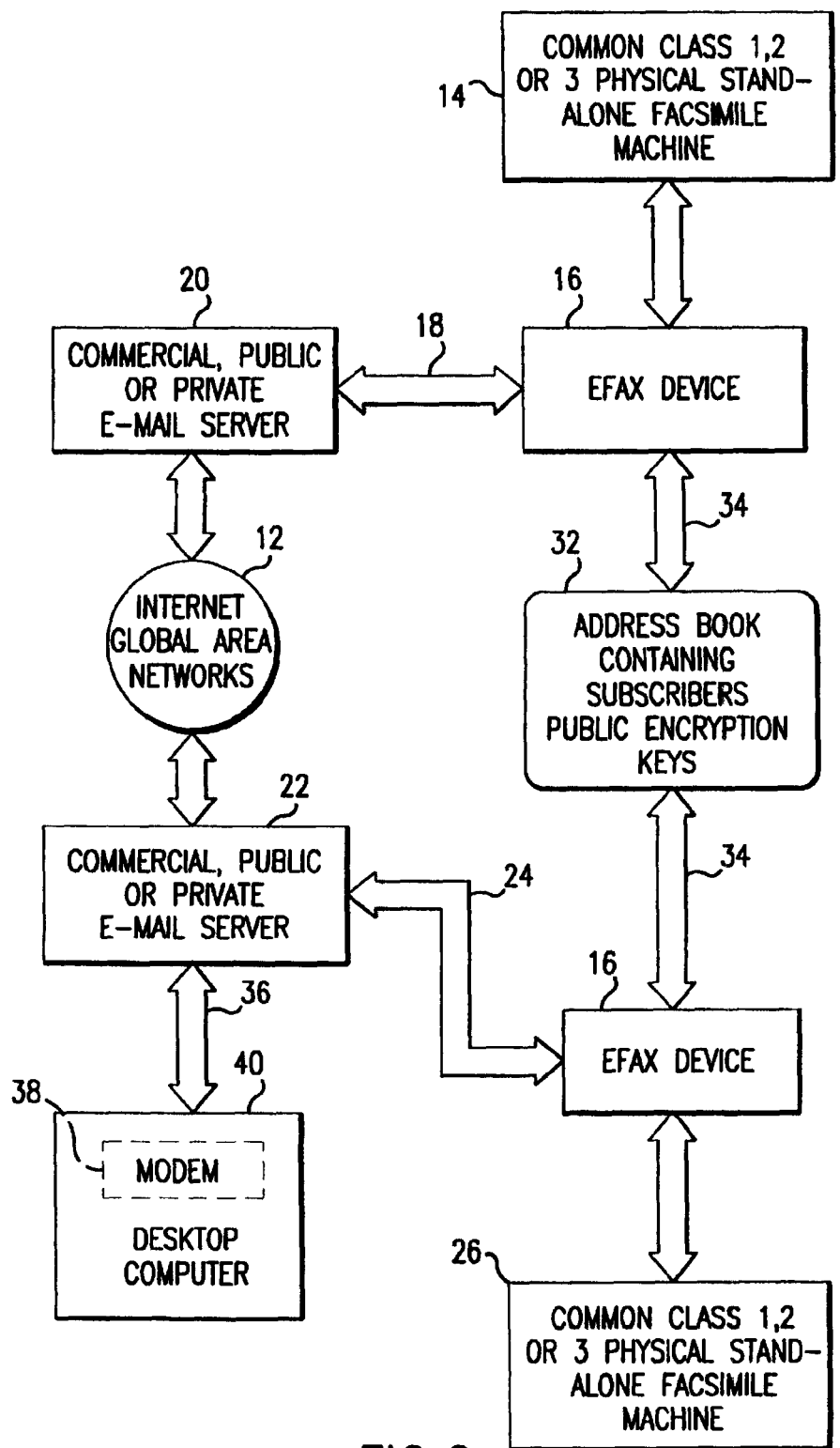
FIG. 2 is a functional block diagram of the system of FIG. 1.

FIG. 2 shows in block diagram form the system of FIG. 1 along with a privately accessible address book of public encryption keys 32 which may be accessed by direct dial up phone lines 34. In addition to the remote device 16 and fax machine 26 the remote agent server 22 may be connected by POTS line 36 to a modem 38 and computer 40 which can store and display the data stream available in the agent server 22.

Figure 3:
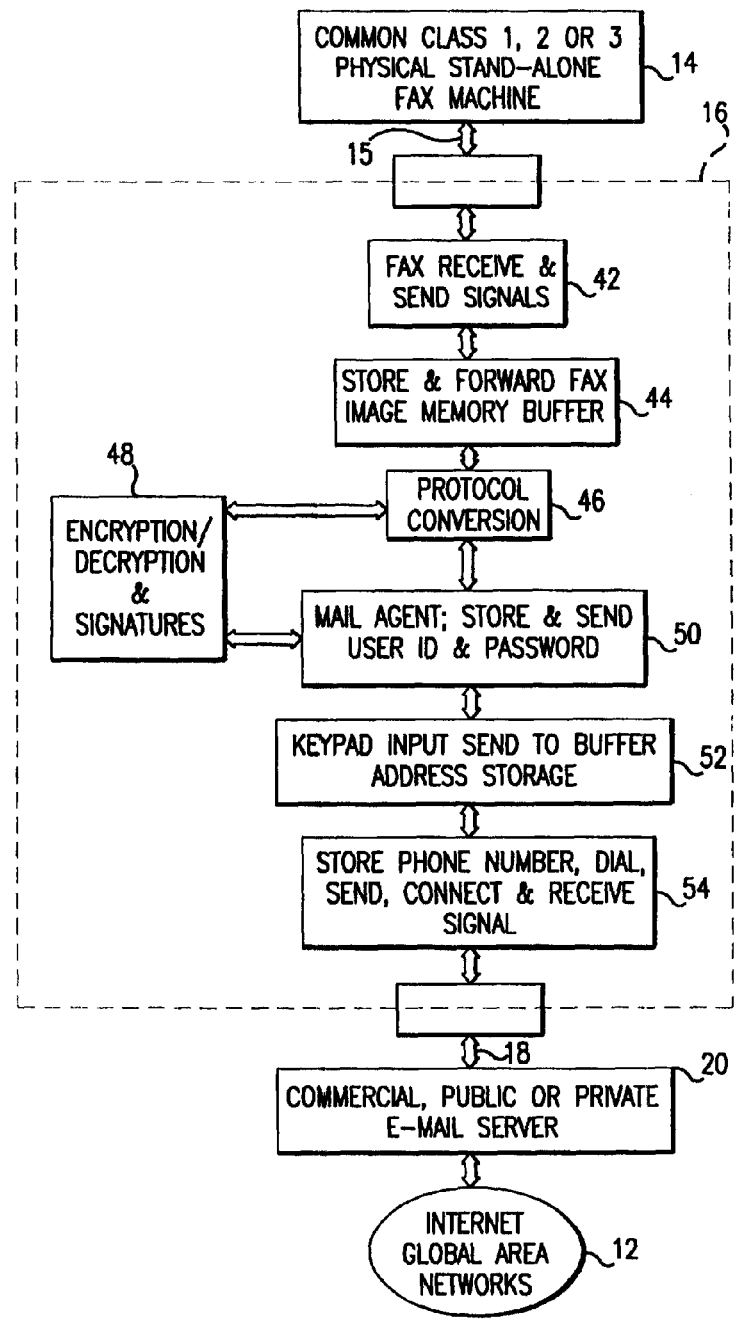
FIG. 3 is a detailed block diagram of the "user ecom" block of FIG. 2.

Referring now to FIG. 3 the signal manipulation device is shown in detailed block diagram form. As will be described herein device 16 takes the fax image data stream and converts it into an e-mail compatible format for transmission over the internet global area network 12. Device 16 will henceforth be called 'ecom' 16. This, along with the necessary management of the entire procedure, is accomplished in one embodiment by the device of FIG. 3.

When fax machine 14 initiates a call the ecom 16 responds as if it were the remote fax machine called by fax 14. The usual handshake and identification information is exchanged by recognition box 42 and when confirmed passed to the store and forward buffer 44. From here the data stream will be sent to the various other functions within ecom 16 in accordance with the instructions in box 42. Data compression/decompression is usually accomplished while the data is in buffer 44 also. Next the native facsimile data stream is converted into electronic mail (e-mail) format in box 46. Image compression including JPEG, GIF, and TIFF; audio and video compression such as MPEG; and e-mail extender such as MIME/MOSS are also accomplished, at this time. If encryption is indicated the converted data stream is directed to encryption/decryption block 48 for coding as will be described later. If coding is not indicated the data stream is passed to electronic mail agent 50 which performs store/send/user/password identification functions as necessary to interface with the selected server 20. Electronic mail agent 50 preferably is a commercial mail agent but it may be any public or private mail agent. In one embodiment both commercial and public electronic mail agents are provided.

Figure 8:
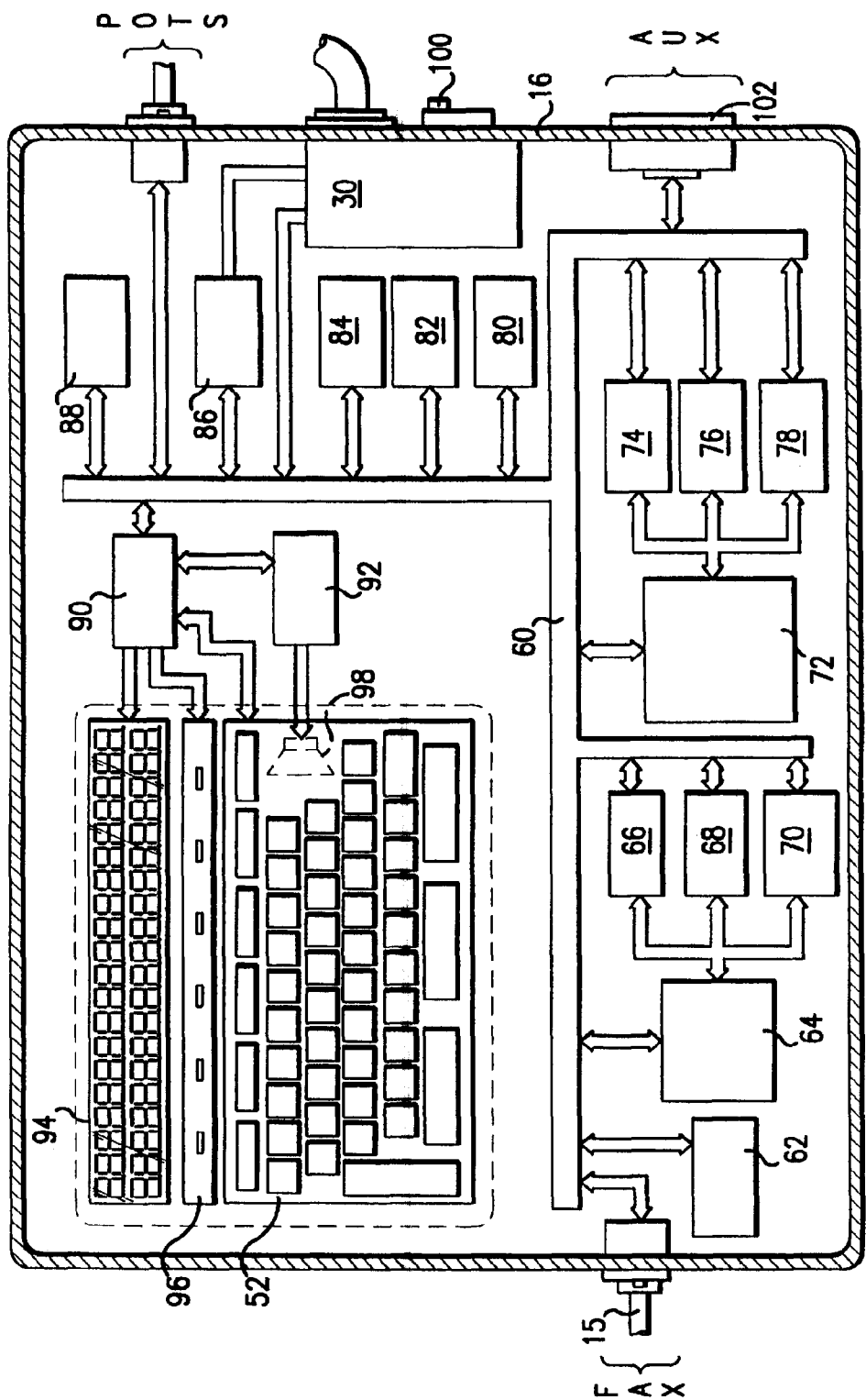
FIG. 8 is a detailed block diagram of an embodiment of the present invention showing the functional components thereof.
Figure 9:
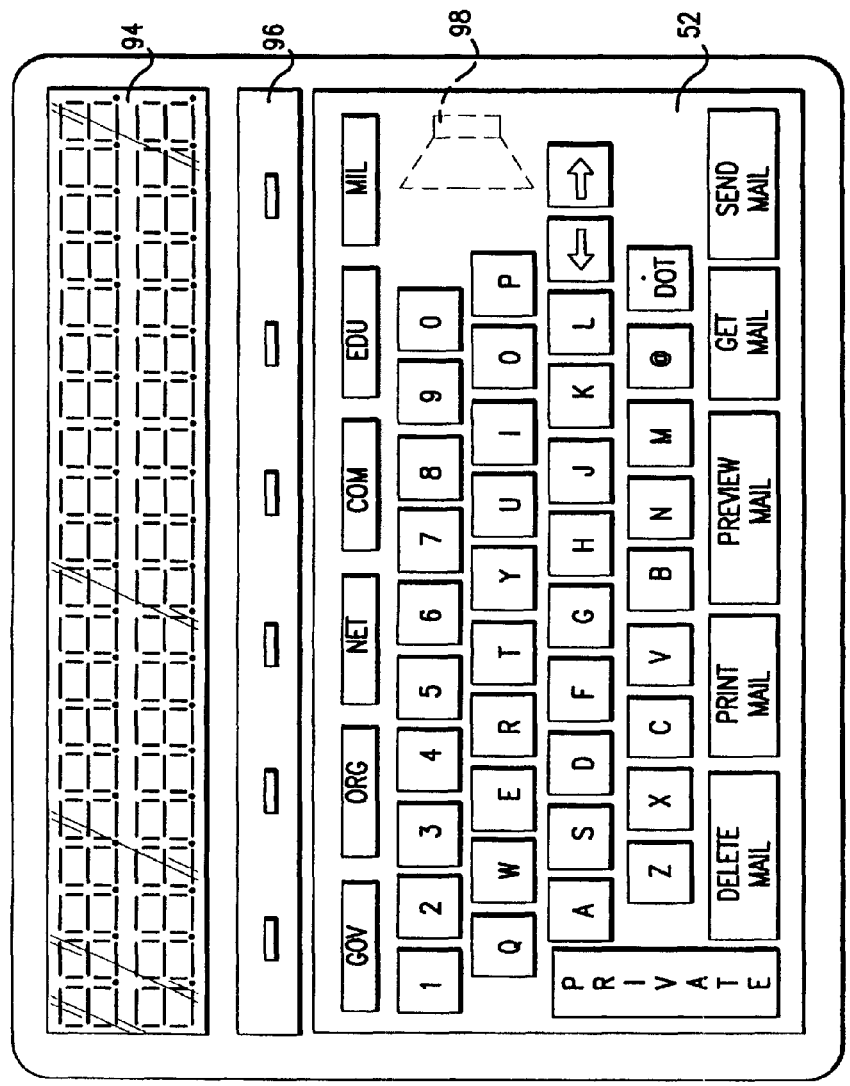
FIG. 9 is a view of a keypad for controlling and operating the present invention.

As may be seen in FIGS. 8 and 9, a keypad 52 is provided to input special instructions, address information and status information such as "e-mail waiting" and the like. From box 52 the converted and formatted data stream is passed to box 54 for final mail agent server phone numbers, send/receive and connect signal functions. The data stream is then ready to be sent dynamically to the selected local agent server 20 resident on the internet global area networks 12 over a POTS line 18.

From this point on the data stream is under the control of the usual global network servers, managers, and providers until it reaches its destination at the remote ecom 16 connected to the addressed remote fax machine 26. The flow diagram shown in FIG. 4 illustrates this sequence of operations.

While I have shown the ecom 16 connected to the server 20 by a telephone line any transport mechanism can be used to transmit the data stream to/from the internet global area network server 20 such as cellular, satellite, microwave and broadcast.

In the event encryption is indicated the converted data stream is routed through box 48 from box 46 and then to electronic mail agent 50. The flow diagram in FIG. 5 illustrates this sequence.

Figure 6:
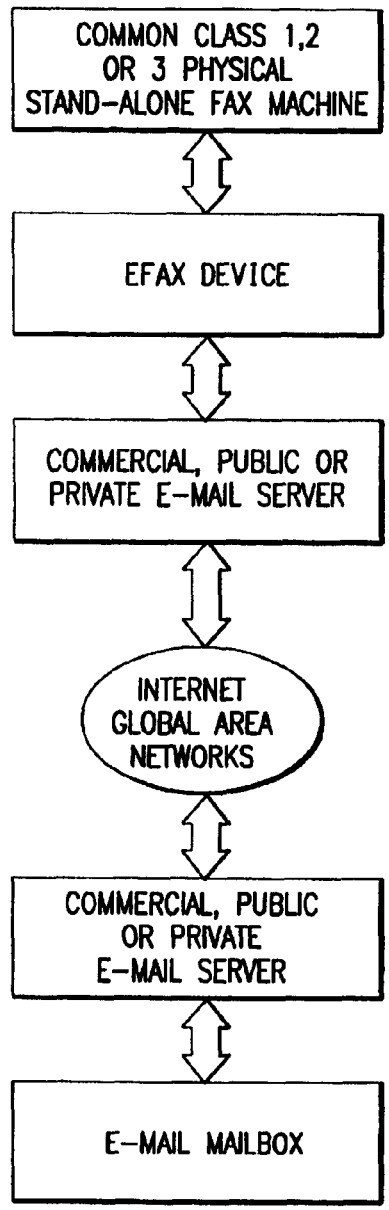

Referring now to FIGS. 2 & 6 there is shown another embodiment of the present invention where the local fax machine 14 can transmit an image to a remote computer. In this configuration since the converted data stream received at server 22 is in e-mail format it can be sent directly to a computer 40 which with the proper modem can store, display and print out the transmitted document.

Figure 7:
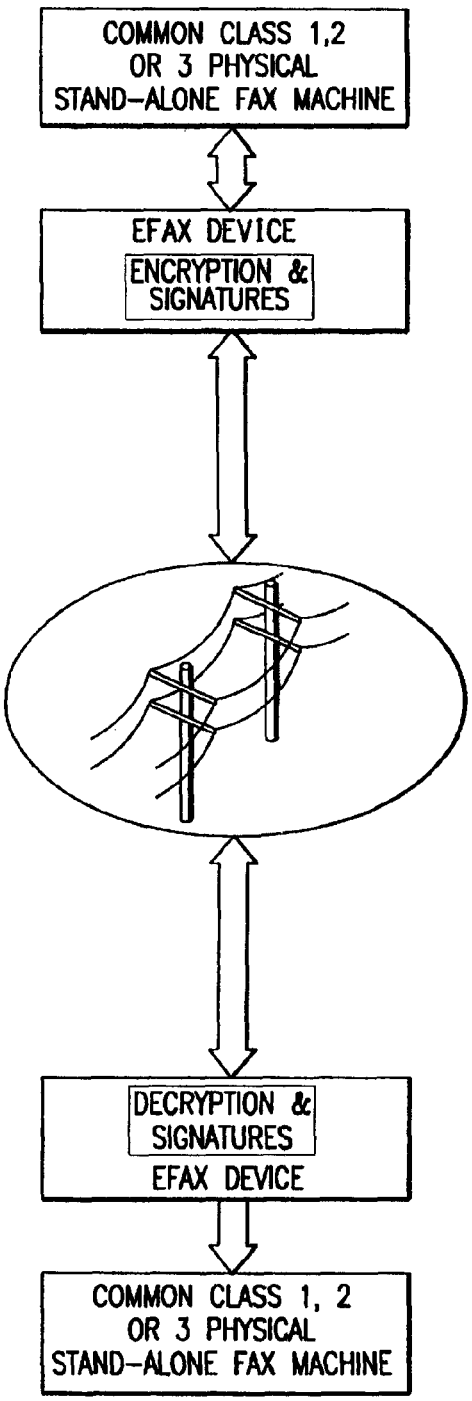

FIG. 7 is a flow diagram of a still further embodiment of the present invention in which it is only desired to encrypt a conventional fax transmission. In this configuration the ecom 16 processes, and encrypts the data stream but then bypasses the agent and sends the signal directly to the POTS line which is also connected to the remote ecom 16 and fax machine 26. The data stream is received by the remote ecom which decrypts it and prints it out on the remote fax machine.

FIG. 8 is a schematic block diagram of the ecom 16 showing the general layout and interconnection of the various components making up the ecom 16. Lines 15 from the physical stand alone fax machines 14 and 26 are connected to the bus 60 in ecom 16. Bus 60 connects all of the components together and to the output POTS lines 18 or 24. Modems 62 and 84 serve as input and output modems during transmission and the reverse for reception of data. CPU 72 contains the instruction sets needed to run the ecom and may be a 386DX/33MHz chip. ASIC chip 64 along with EPROM 68 contain the software instruction sets for the CPU and the TCP/IP, SMTP,MTA protocols and the algorithms for attaching the class 1, 2, and 3 fax data stream (Phase C11 data) to MIME enabled commercial and/or public electronic mail format. EPROM 70 is a mail user agent that contains the commercial and/or public mail boxes and EPROM 66 is a flash EPROM containing the encryption/decryption algorithms. RAMS 74, 76, and 78 provide for storing and forwarding data to the ASIC and CPU chips and to the attached facsimile and e-mail data streams. D/A block 88 is an analog to digital converter which encapsulates the fax image data stream into MIME e-mail digital format and vice versa. Block 80 provides compression/decompression operations on the data streams. USART block 90 is a universal asynchronous transmitter/receiver chip for transferring the keypad 52 entered commands to the foregoing components and to the displays 94 and 96. which indicate system status. A voice chip 92 and speaker 98 and auxiliary port 102 may also be provided. The fax machine and POTS lines are connected through standard RJ11 connectors. The power supply 30, which may be housed within ecom 16 if desired as shown in FIG. 8, takes standard AC power and converts it to the necessary line tone/ring generator, DC and other voltages necessary for running the ecom 16. An on/off switch 100 turns the ecom on and off.

Referring now to FIG. 9 the keypad 52 has the usual QWERTY keyboard and the usual numerals 1 through 0. In addition there are provided special function keys that combine several key stroke commands of the usual computer into single stroke keys for the particular functions. Thus the @ key, the Dot key, for addressing e-mail; COM for commercial, NET for network, EDU for education, ORG for other organizations, MIL for military, and GOV for government, provide quick accurate domain addressing; SEND MAIL, GET MAIL, PREVIEW MAIL, DELETE MAIL, PRINT, for the obvious operations and PRIVATE for coding transmissions are also provided.

To send a fax from a local to a remote fax machine over the internet global area networks according to the present invention the following dynamic sequence takes place:

The user inputs the e-mail address of the selected remote fax machine via the keypad 52. The LCD 94 displays, via the USART 90 this input. The user then depresses the SEND MAIL key. If native fax data is present in the memory buffer the CPU instruction set begins conversion of the data together with the ASIC 64 into e-mail Mail User Agent format. If no native fax data is present in memory then the LCD 94 displays a "waiting for fax" default message. The modified data is compressed via box 80 and the CPU checks to see if encryption is indicated. If encryption is required the CPU instructs the ASIC 64 with EPROM 70 to perform the encryption and stores the result in memory. The LCD 94 then indicates "mail is ready for delivery". The user then presses SEND MAIL again and the CPU retrieves the e-mail server telephone number stored in EPROM or RAM and initializes modem 84, converter 88 and DSP 82 and via the LTG 86 dials the proper phone number. After the proper return codes and hand shake is completed with the e-mail server the CPU sends the e-mail stored in the buffer and clears the buffer. Upon receipt of proper server return codes that the message has been received the CPU instructs the modem 84 to close and the ecom is returned to ready for further traffic.

At the receiving end after transitting the internet global area networks the data manipulation sequence in the remote ecom is essentially the reverse of that just described. In addition a user of the ecom can query its mail server to see if there is fax e-mail waiting that could not be delivered previously. Also e-mail other than converted fax image data can be printed out on a fax machine attached to an ecom device. The user presses GET MAIL which displays the command on LCD 94 and then the CPU instructs the appropriate EPROM to retrieve the appropriate server phone number and to dial same via the modem 86. After proper identification and handshake if there is mail the server will send it to the MUA EPROM 70 and the CPU will then send it to memory buffer and terminate connection to the server. The usual "preview mail" capability can also be included in ecom 16 if desired.

While there are given above certain specific examples of this invention and its application in practical use, it should be understood that they are not intended to be exhaustive or to be limiting of the invention. On the contrary, these illustrations and explanations herein are given in order to acquaint others skilled in the art with this invention and the principles thereof and a suitable manner of its application in practical use, so that others skilled in the art may be enabled to modify the invention and to adapt and apply it in numerous forms each as may be best suited to the requirement of a particular use.

What is claimed is:

1. An apparatus for receiving facsimile data from a Class 2 or 3 facsimile machine and packaging said facsimile data for delivery to an intended recipient over a computer network, said apparatus comprising:
    a self contained facsimile data receiver which generates a dial tone for said facsimile machine, wherein said facsimile data receiver is adapted to be connected to said facsimile machine and receives from said facsimile machine said facsimile data and the telephone number of said intended recipient of said facsimile data;
    a delivery address device coupled to said facsimile data receiver for deriving delivery address information from said telephone number;
    an image data restore device coupled to said facsimile data receiver for restoring said facsimile data to native facsimile image data;
    an electronic mail agent coupled to said delivery address device and to said image data restore device for converting said delivery address information and said native facsimile image data to an electronic mail compatible format; and
    a transmission device coupled to said electronic mail agent for transmitting an electronic mail message carrying said native facsimile image data to said computer network for delivery to the intended recipient.

2. The apparatus of claim 1 further including a compression device coupled to the said image data restore for compressing said native facsimile image data.

3. The apparatus of claim 1, wherein said electronic mail agent includes password means for providing a password for said computer network.

4. The apparatus of claim 1, wherein said electronic mail agent includes user ID means for providing a user ID for said computer network.

5. The apparatus of claim 1, wherein said facsimile data receiver includes a telephone connection device for establishing a telephone connection with said facsimile machine.

6. The apparatus of claim 1, wherein said transmission device includes a telephone connection device for establishing a telephone connection with said computer network.

7. The apparatus of claim 1, further including a receiving device coupled to said electronic mail agent for receiving an electronic mail message carrying native facsimile image data from said computer network.

8. The apparatus of claim 7, wherein said compression device compresses said native facsimile image data received from said computer network in a format compatible with a class 1, 2, or 3 facsimile machine.

9. The apparatus of claim 8, wherein said apparatus further includes a facsimile data transmitter adapted for coupling to said facsimile machine to transmit said facsimile image data to said fax machine.

10. The apparatus of claim 7, wherein said electronic mail agent includes means for converting said received native facsimile native facsimile image data to a displayable form for display on an output device.

11. The apparatus of claim 10, wherein said output device is the print mechanism of a facsimile machine.

12. A method for transmitting and receiving facsimile image data over a computer network comprising the steps of:
    emulating a public switched telephone network connection to a facsimile machine;
    transmitting to or receiving from said facsimile machine over said emulated connection, image data in a facsimile transmission format;
    transmitting to or receiving from a computer network over a standard public switched telephone network connection, image data attached to electronic mail format data;
    converting between image data in a facsimile transmission format and image data attached to electronic mail format data; and
    controlling communication of image data in a facsimile transmission format to or from said facsimile machine over said emulated connection and image data attached to electronic mail format data over said standard connection.

* * * * *